Sept. 26, 1933.  M. E. CARLISLE  1,928,005
GLASS GRINDING APPARATUS
Filed Nov. 26, 1932  3 Sheets-Sheet 1
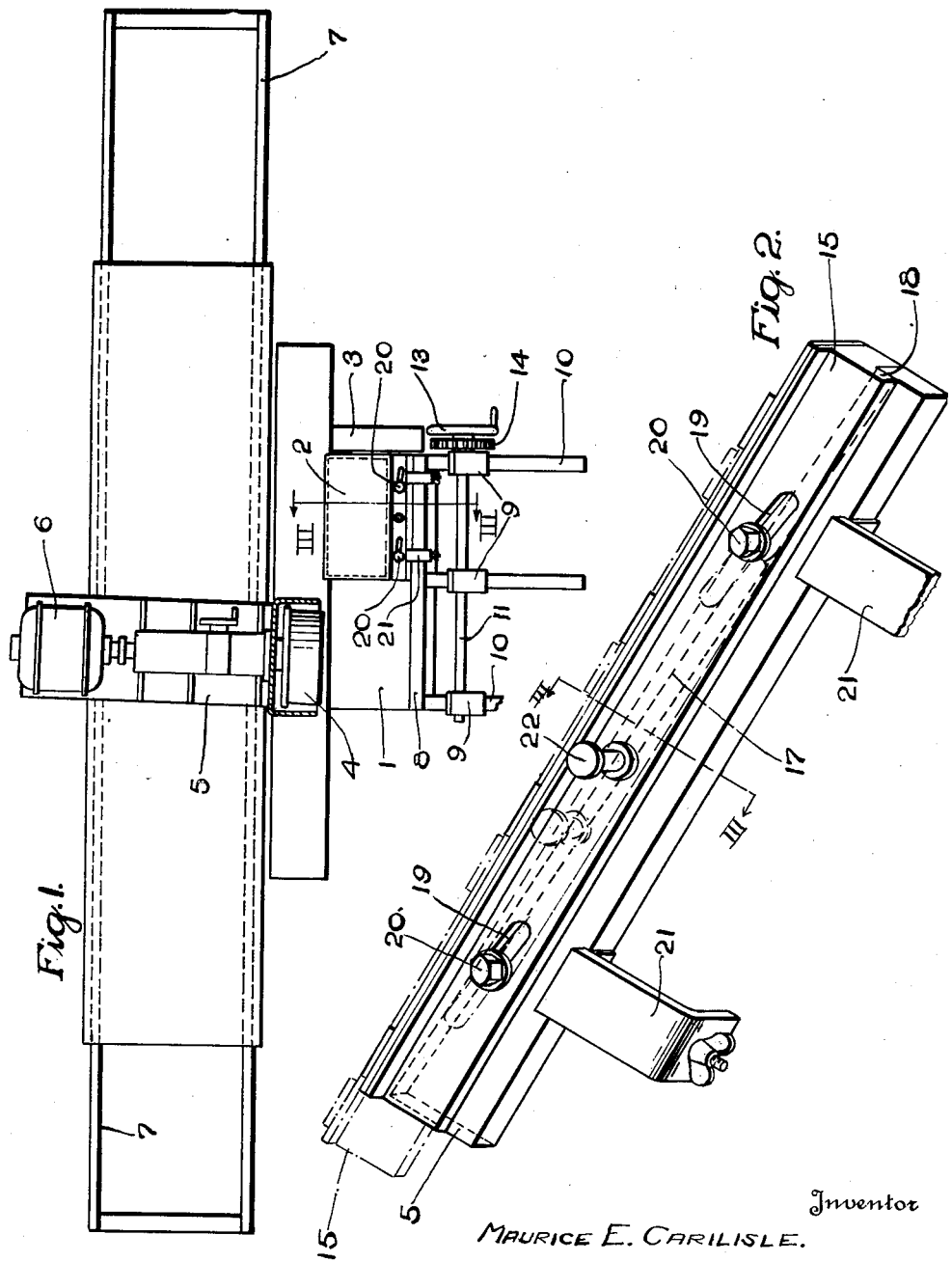
Inventor
MAURICE E. CARLISLE.
By Bradley & Bee
Attorneys Sept. 26, 1933.        M. E. CARLISLE           1,928,005
               GLASS GRINDING APPARATUS
            Filed Nov. 26, 1932      3 Sheets-Sheet 2
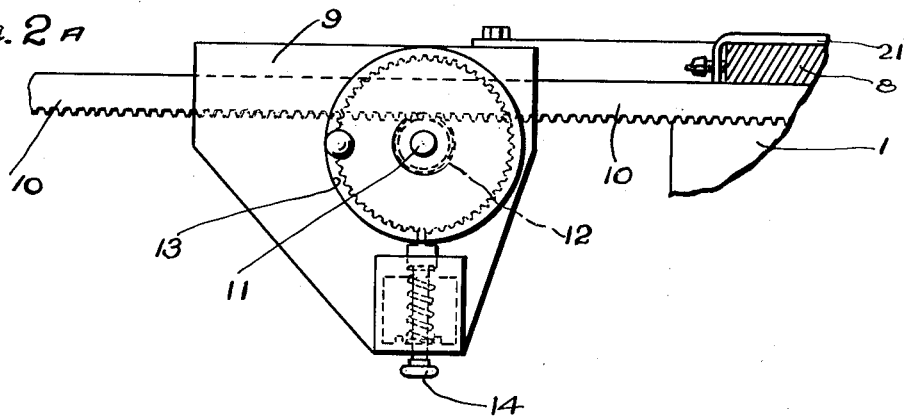
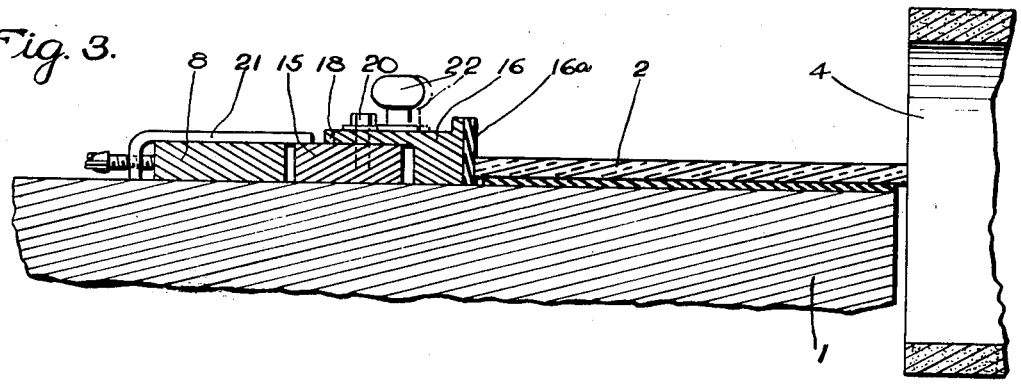
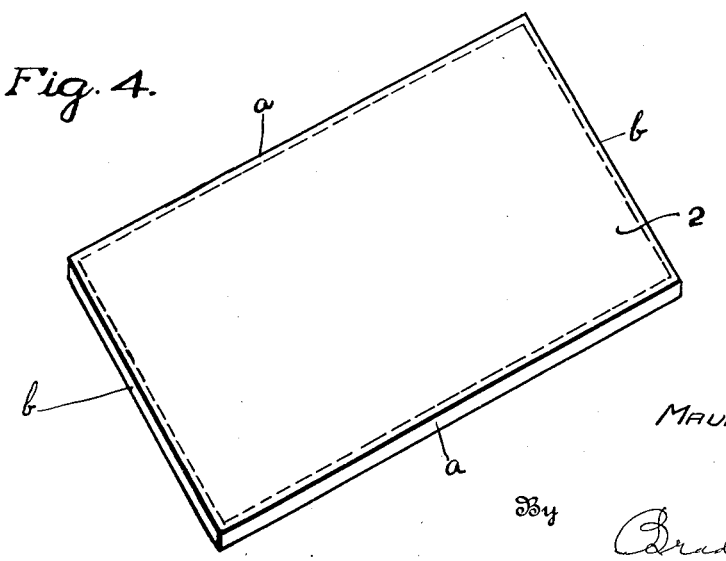
Inventor
MAURICE E. CARLISLE
By
Bradley & Bu
Attorneys

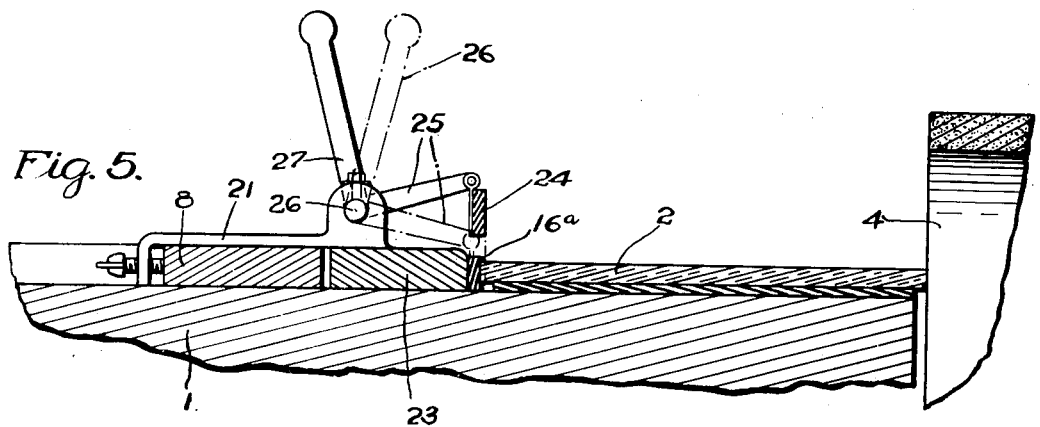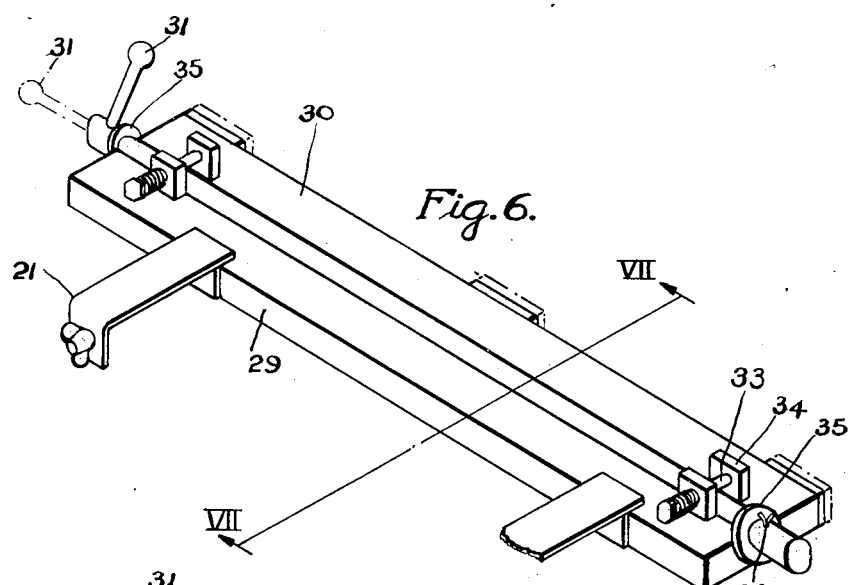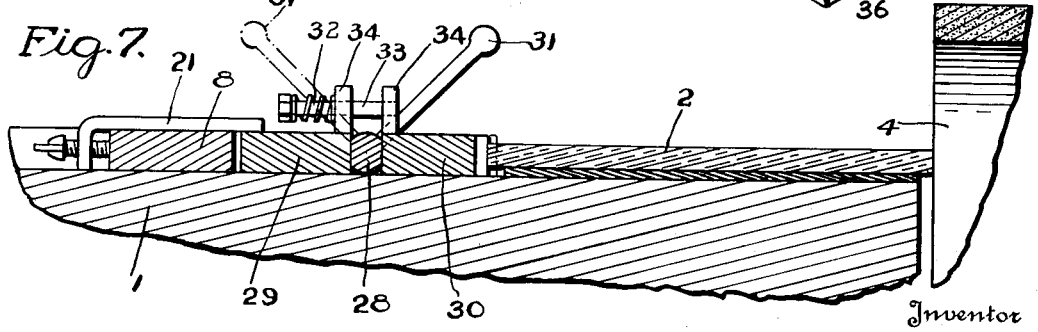

UNITED STATES PATENT OFFICE 1,928,005

GLASS GRINDING APPARATUS

Maurice E. Carlisle, Ben Avon, Pa., assignor to Pittsburgh Plate Glass Company, a corporation of Pennsylvania Application November 26, 1932
Serial No. 644,439

5 Claims. (Cl. 51—56)

The invention relates to apparatus for grinding the opposite edges of glass plates to smooth such edges and bring the plates to exact dimension. It is particularly useful in the edging of small plates where large quantities of the same size are to be brought to exactly the same size. It has for its primary object the provision of an improved apparatus of the character described which can be operated rapidly to grind the two edges and distribute the work of grinding evenly, so that substantially the same amount of material is cut from each edge of the plate in bringing the plate to exact dimensions. In practicing the invention the plate of glass to be edged or ground is secured upon the top of a fixed table past which a vertical grinding wheel is moved in a horizontal direction to carry the wheel along the edge of the plate, but it will be understood that this arrangement might be reversed, so that the wheel would be fixed and the table moved past it in a horizontal direction. Certain embodiments are shown in the accompanying drawings, wherein:

Figure 1 is a plan view of the apparatus. Fig. 2 is a perspective view of a part of the apparatus. Fig. 2ª is a partial end elevation. Fig. 3 is a section through the apparatus on the line III—III of Figs. 1 and 2. Fig. 4 is a diagrammatic view of a plate of glass with the dotted lines showing the amount of glass cut off in the edging operation. Fig. 5 is a vertical section similar to Fig. 3 through a modification. And Figs. 6 and 7 are views of still another modification, Fig. 6 being a perspective view of a part of the apparatus, and Fig. 7 a section through the complete apparatus on the line VII—VII of Fig. 6.

Referring to the drawings, 1 is a table rigidly mounted and carrying the plate of glass 2 which is to have its edges ground and be reduced to a predetermined size as hereafter explained, such plate being engaged at one end by a stop 3 which projects above the surface of the table. The grinding is accomplished by means of an annular wheel 4 mounted on a carriage 5 and driven by an electric motor 6, also mounted on the carriage. The carriage is mounted for movement along a track 7 and is moved back and forth along this track by suitable means (not shown) which carries the wheel along the edge of the glass plate 2 which projects out past the edge of the table and cuts or grinds away enough glass to smooth the edge and reduce the width of the plate as the first step in bringing the plate to an exact predetermined size.

Fig. 4 indicates diagrammatically the amount of glass which is to be removed from the four sides of the plate to bring it to its desired size, this being accomplished by grinding off a part of the glass at all four edges true and smooth. If the plate is a quarter of an inch over size, each way, it is desirable to divide the grinding work as evenly as possible so that an eighth of an inch would be removed from each edge to bring the plate to the size as shown by the dotted lines in Fig. 4. In using the apparatus to size a large number of similar plates, the plates are all ground on their two parallel edges $a$, $a$ first, after which the apparatus is reset, and the other two edges $b$, $b$ of all the plates are ground. In grinding a plate, it is placed on the table with a stop behind it so positioned that when the grinding wheel is carried past the sheet approximately one-half the glass necessary for bringing the plate to its final dimension is removed. The plate is then reversed to bring the other edge next the wheel and the stop is adjusted forward a distance such that the next passage of the wheel brings the sheet to its final dimension. The stop mechanism, which will now be described, permits of the above operation without any loss of time other than that incident to the reversing of the plate at the same time insuring that substantially the same amount of glass will be removed from the two edges of the plate and that the plate shall be of the desired final dimension in width.

Mounted on the top of the table 1 for sliding movement toward the grinding wheel is a bar 8 referred to as a backstop, to which is secured three crossheads 9, 9, 9, slidably mounted on rack bars 10, 10, 10, which are bolted to the table. A transverse shaft 11 is mounted in the cross heads and carries three pinions 12, 12, 12 which engage the racks, so that when the shaft is rotated, the crossheads and the backstop 8 are moved toward or from the glass sheet depending on the direction of rotation of the shaft. The shaft 11 is provided at its end with a hand wheel 13 and a locking means in the form of the gear wheel 14 keyed to the shaft and the spring pressed locking pin 14.

Intermediate the backstop 8 and the edge of the glass plate 2 are a filler member 15 and a stop member 16 having opposing inclined or wedge faces 17 as indicated in Fig. 2 so that when the stop member is moved endwise its edge which opposed the edge of the glass plate is moved in or out depending on the direction of longitudinal movement. The stop member has rubber pads 16a for engaging the glass and is provided with a flange 18 overlying the top of the filler member 15 (Fig. 3), which flange is provided with slots 19 engaged by bolts 20 carried by the filler member. The slots and bolts constitute stop means for limiting the longitudinal movement of the stop member 16. The member 15 is clamped to the backstop by the brackets 21. The stop member is also provided with a knob or handle 22 for engagement by the operator in moving such member. The inclined face 17 and the length of the slots 19 are such that the endwise movement of the stop member within the limits thus fixed moves the edge of the stop member toward the wheel one-half of the distance necessary to reduce the plate 2 from its original size to its finished size.

In operation the backstop 8 is adjusted so that when the stop member 16 is in its forward position, the distance between the edge of such member and the edge of the grinding wheel is just equal to the width of the finished plate to be produced. The stop member is then retracted by moving it endwise and the glass plate is positioned on the table with its side edge against said member and its end edge against the stop 3, as indicated in Fig. 1, the grinding wheel being positioned at this time as indicated in such figure. The wheel is now moved to the right (Fig. 1) by its carriage, thus moving it along the edge of the plate and grinding off approximately one-half of the amount of glass to be removed in order to bring the plate to final size. The plate is now lifted and reversed to bring its unground edge to grinding position while the grinding wheel is being returned to starting position. When the plate is lifted for this reversal, the operator grasps the knob 22 and moves the stop member endwise, thus camming such member outward to its original position of adjustment. The plate now being positioned against the stop member, the operation is repeated, thus grinding the second edge and reducing the plate to its final exact width. This operation is repeated with the other plates belonging to the series which are being reduced to the same size. This procedure insures that the plate will be reduced to exact size with about the same cut from each edge of the plate, making the work of the wheel uniform and no appreciable time is lost in adjusting the device when the plate is reversed since there are only two positions of adjustment which are definitely fixed and require no care or accuracy in the shifting movement.

Fig. 5 illustrates a modification in which the filler member 23 acts as a stop member during the first grinding step, such member being clamped to the backstop 8 as before. When the glass plate is removed and reversed for the second grinding step, the stop plate 24 of hard rubber is moved down to a position in front of the edge of the filler member, the thickness of the plate 24 representing the additional thickness of glass which is to be cut from the plate during the second grinding operation. The grinding operation is then repeated. The plate 24 is supported on arms 25 carried by a shaft 26, and this shaft is turned by the handle 27, a spring index pin fitting into recesses in the shaft serving to yieldingly maintain the shaft in either of its positions.

Fig. 6 illustrates another modification quite similar to that of Fig. 1 and differing primarily in the use of a cam shaft 28 to take the place of the wedge surface 17 of the Fig. 1 construction. This shaft lies between the filler member 29 and the stop member 30 and is turned by the handle 31. The two members are yieldingly pulled toward each other by the springs 32 on the bolts 33 extending through sets of lugs 34 on the two members. In order to adjust the stop member 30 forward for the second cutting operation, the shaft is turned 90 degrees from the position of Fig. 7. Washers 35 and pins 36 carried by the cam shaft hold it against endwise movement.

What I claim is:

1. In combination with a grinding wheel and a table adapted to support a plate of glass to be ground to predetermined width with one edge projecting out past the edge of the table, one of which parts is movable horizontally with respect to the other to carry the wheel along the edge of the table, a backstop secured to the table, and adjustable toward and from the wheel depending on the width of the plates to be ground, and adjustable stop means between the backstop and the edge of the glass plate having two positions of adjustment, differing in position by approximately one-half the total thickness of glass which must be removed from the plate by the grinding wheel in order to reduce it to its predetermined width.

2. In combination with a grinding wheel and a table adapted to support a plate of glass to be ground to predetermined width with one edge projecting out past the edge of the table, one of which parts is movable horizontally with respect to the other to carry the wheel along the edge of the table, a backstop secured to the table, and adjustable toward and from the wheel, depending on the width of the plates to be ground, a filler member and a stop member between the backstop and the edge of the glass plate, and adjusting means between said members which in one position holds the plate so that approximately one-half of the width of glass to be removed from the plate in reducing it to predetermined width is removed by the grinding wheel and which in its other position holds the plate so that the remainder of the width of glass to be removed by the wheel in order to bring the plate to its predetermined width is removed.

3. In combination with a grinding wheel and a table adapted to support a plate of glass to be ground to predetermined width with one edge projecting out past the edge of the table, one of which parts is movable horizontally with respect to the other to carry the wheel along the edge of the table, a backstop secured to the table, and adjustable toward and from the wheel depending on the width of the plates to be ground, a filler member and a stop member having opposing inclined surfaces lying between the backstop and the edge of the glass plate, one of which members is movable longitudinally of the other between fixed limits to move the stop member toward the wheel, the amount of adjustment of the stop member secured by said longitudinal movement of said member being equal to substantially one-half of the width of the glass to be removed from the plate in order to reduce it to its predetermined width.

4. In combination with a grinding wheel and a table adapted to support a plate of glass to be ground to predetermined width with one edge projecting out past the edge of the table, one of which parts is movable horizontally with respect to the other to carry the wheel along the edge of the table, a backstop secured to the table, and adjustable toward and from the wheel depending on the width of the plates to be ground, a filler member and a stop member between the backstop and the edge of the glass plate, and a cam between the two members arranged when rotated between fixed limits to move the stop member forward a distance equal to substantially one-half of the width of the glass to be removed from the plate in order to reduce it to its predetermined width.

5. In combination with a grinding wheel and a table adapted to support a plate of glass to be ground to predetermined width with one edge projecting out past the edge of the table, one of which parts is movable horizontally with respect to the other to carry the wheel along the edge of the table, a backstop secured to the table, and adjustable toward and from the wheel depending on the width of the plates to be ground, a filler member between the backstop and the edge of the glass plate adapted to act as stop means for holding the plate in its first grinding position, and a stop plate mounted on the filler member for vertical movement so that in one position it lies above the filler member and in the other it lies in front of the forward edge of the filler member and acts as a stop for positioning the edge of the plate in its second grinding position which reduces the plate to its predetermined width.

MAURICE E. CARLISLE.